United States Patent
Yacobi et al.

(10) Patent No.: US 9,585,155 B2
(45) Date of Patent: Feb. 28, 2017

(54) OPTIMIZING THE ALLOCATION OF SPARE RESOURCES

(71) Applicant: QUALCOMM Incorporated, San Diego, CA (US)

(72) Inventors: Eitan Yacobi, Zichron-Ya'akov (IL); Bjorn Jakobsson, Portola Valley, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/664,495

(22) Filed: Mar. 20, 2015

(65) Prior Publication Data
US 2016/0278099 A1 Sep. 22, 2016

(51) Int. Cl.
H04W 72/00 (2009.01)
H04W 72/04 (2009.01)
H04W 24/02 (2009.01)
G06F 1/32 (2006.01)
G06F 9/50 (2006.01)

(52) U.S. Cl.
CPC ............ H04W 72/0493 (2013.01); G06F 1/32 (2013.01); G06F 9/50 (2013.01); H04W 24/02 (2013.01)

(58) Field of Classification Search
CPC .................... H04W 72/0493; H04W 24/02
USPC .......... 455/450, 451, 452.1, 452.2, 453–454, 455/464, 509–514
See application file for complete search history.

(56) References Cited

U.S. PATENT DOCUMENTS

| | | | |
|---|---|---|---|
| 7,698,402 B2 | 4/2010 | Santos et al. | |
| 8,175,617 B2 | 5/2012 | Rhoads et al. | |
| 8,832,695 B2 | 9/2014 | Ujibashi | |
| 2002/0169877 A1* | 11/2002 | Bantz | H04L 63/0428 709/226 |
| 2003/0204759 A1* | 10/2003 | Singh | G06F 1/3203 713/320 |
| 2005/0066328 A1* | 3/2005 | Lam | G06F 9/5083 718/100 |
| 2006/0167732 A1* | 7/2006 | Ricketts | G06Q 10/06 705/7.23 |
| 2008/0259710 A1* | 10/2008 | Wenzel | G06F 1/3221 365/226 |
| 2008/0317162 A1* | 12/2008 | Roh | H04L 1/189 375/295 |

(Continued)

FOREIGN PATENT DOCUMENTS

| | | |
|---|---|---|
| WO | 2006097512 A1 | 9/2006 |
| WO | 2009058154 A1 | 5/2009 |

OTHER PUBLICATIONS

Amir Y., et al., "A Cost-Benefit Framework for Online Management of a Metacomputing System," Decision Support Systems, Mar. 2000, vol. 28 (1-2), pp. 155-164.

(Continued)

Primary Examiner — Shahriar Behnamian
(74) Attorney, Agent, or Firm — Blakely Sokoloff Taylor & Zafman, LLP

(57) ABSTRACT

Aspects of the invention are related to a method for allocating spare resources in a device. The exemplary method comprises: determining spare resources available in a plurality of consecutive time quanta; determining a plurality of candidate operations, wherein each candidate operation is associated with a cost profile with respect to time and a benefit value; and allocating the spare resources for performance of one or more of the candidate operations.

24 Claims, 5 Drawing Sheets

(56) References Cited

U.S. PATENT DOCUMENTS

| | | | | |
|---|---|---|---|---|
| 2010/0115095 A1* | 5/2010 | Zhu | ............ | H04L 67/12 |
| | | | | 709/226 |
| 2010/0306382 A1* | 12/2010 | Cardosa | ............ | G06F 9/5044 |
| | | | | 709/226 |
| 2010/0322065 A1* | 12/2010 | Kang | ............ | H04L 5/0007 |
| | | | | 370/210 |
| 2012/0102497 A1 | 4/2012 | Stahl | | |
| 2012/0208582 A1* | 8/2012 | Kang | ............ | H04W 16/14 |
| | | | | 455/509 |
| 2013/0091257 A1* | 4/2013 | Venugopal | ............ | H04L 41/0826 |
| | | | | 709/221 |
| 2013/0155987 A1* | 6/2013 | Lan | ............ | H04L 1/0027 |
| | | | | 370/329 |
| 2013/0182661 A1* | 7/2013 | Piipponen | ............ | H04W 72/0473 |
| | | | | 370/329 |
| 2014/0031049 A1* | 1/2014 | Sundaresan | ............ | H04W 16/02 |
| | | | | 455/447 |
| 2015/0271331 A1* | 9/2015 | Segre | ............ | H04M 3/5232 |
| | | | | 379/265.09 |

OTHER PUBLICATIONS

International Search Report and Written Opinion—PCT/US2016/022664—ISA/EPO—Jun. 10, 2016.
Srinivasan P.K., "Implementation and Evaluation of Proportional Share Scheduler on Linux Kernel 2.6," Mar. 2008, 121 Pages.

\* cited by examiner

OPTIMIZING THE ALLOCATION OF SPARE RESOURCES

FIELD

The subject matter disclosed herein relates to electronic devices, and more particularly to methods, apparatuses, and systems for optimizing the allocation of spare resources.

BACKGROUNDS

Efficient resource scheduling is useful in extending the battery life in a mobile device. However, in today's mobile devices, certain resources, such as computational power (i.e., computational cycles), bus availability, and battery consumption, cannot be allocated in continuous amounts. In other words, sometimes more resources than necessary have to be allocated and expended. Therefore, the allocation of resources in non-continuous amounts may result in expended spare resources that go to waste.

Certain applications utilized by mobile devices may benefit from the continual availability of relatively small amounts of spare resources. Such applications may include continuous implicit security and authentication applications, and map applications that require frequent location fix updates, etc.

SUMMARY

Aspects of the invention are related to a device that allocates spare resources to one or more operations. The device may comprise: a memory; and a processor to: determine spare resources available in a plurality of consecutive time quanta; determine a plurality of candidate operations, wherein each candidate operation is associated with a cost profile with respect to time and a benefit value; and allocate the spare resources for performance of one or more of the candidate operations.

DETAILED DESCRIPTION

Aspects of the invention are disclosed in the following description and related drawings directed to specific embodiments. Alternate embodiments may be devised without departing from the scope of the invention. Additionally, well known elements may not be described in detail or may be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

Further, many embodiments are described in terms of sequences of actions to be performed by, for example, elements of a computing device (e.g., a server or device). It will be recognized that various actions described herein can be performed by specific circuits (e.g., application specific integrated circuits), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
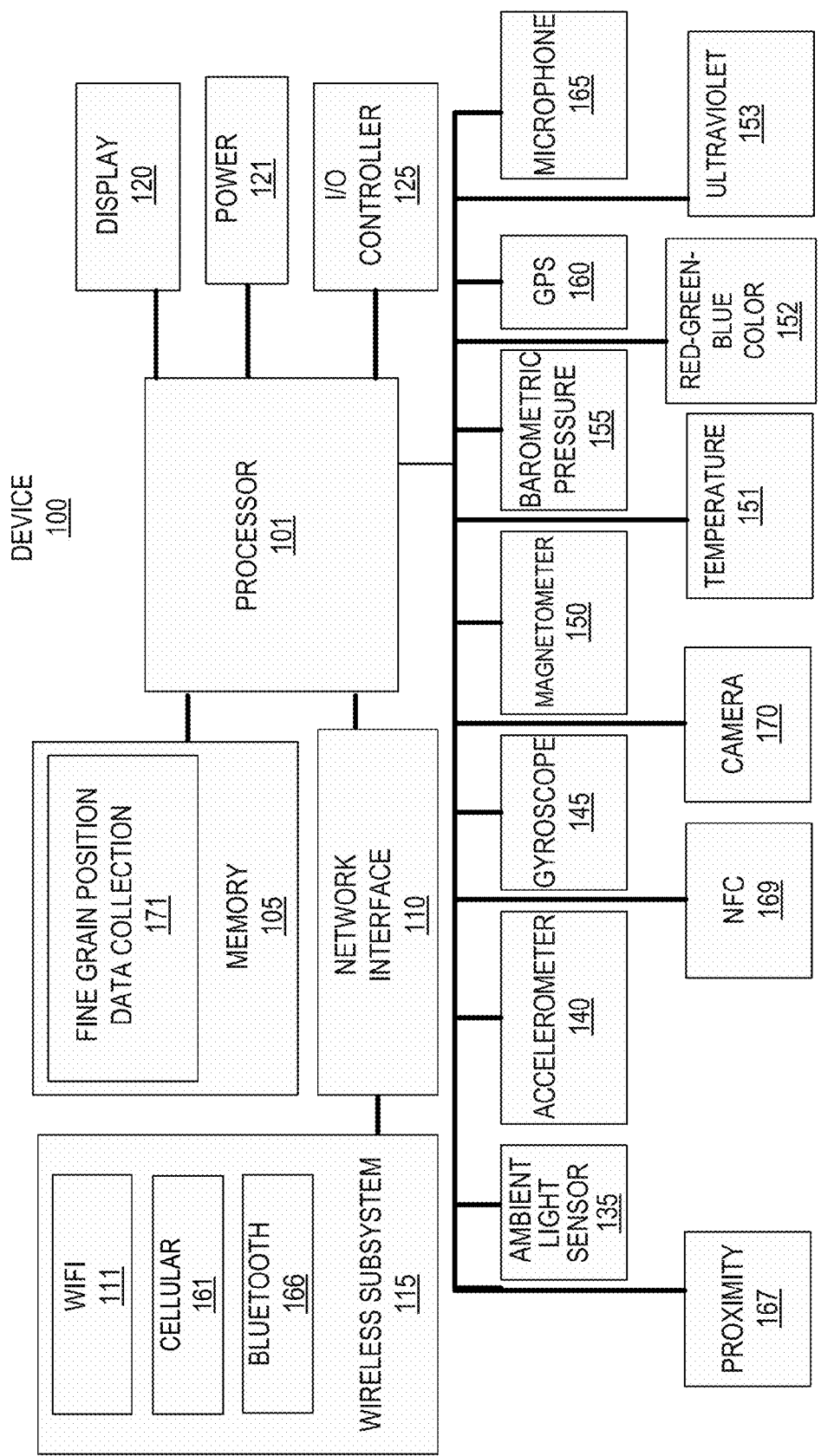
FIG. 1 is block diagram illustrating an exemplary mobile device in which embodiments may be practiced.

FIG. 1 is block diagram illustrating an exemplary device 100 in which embodiments of the invention may be practiced. The device 100 may include one or more processors 101, a memory 105, I/O controller 125, and network interface 110. Device 100 may also include a number of device sensors coupled to one or more buses or signal lines further coupled to the processor 101. It should be appreciated that device 100 may also include a display 120, a user interface (e.g., keyboard, touch-screen, or similar devices), a power device 121 (e.g., a battery), as well as other components typically associated with electronic devices. In some embodiments, device 100 may be a mobile or non-mobile device. Herein "processor" and "data processing unit" are used interchangeably.

Device 100 may include sensors such as ambient light sensor (ALS) 135, accelerometer 140, gyroscope 145, magnetometer 150, temperature sensor 151, barometric pressure sensor 155, red-green-blue (RGB) color sensor 152, ultraviolet (UV) sensor 153 (e.g., UV-A sensor, UV-B sensor), proximity sensor 167, near field communication (NFC) 169, and/or Global Positioning Sensor (GPS) 160. In some embodiments, multiple cameras are integrated or accessible to the device. For example, a mobile device may have at least a front and rear mounted camera. In some embodiments, other sensors may also have multiple installations or versions. It should be appreciated that a wide variety of different types of sensor (not shown here) may be utilized by a mobile device, and that this list is not exhaustive. For example, biometric sensors may be utilized, such as pulse sensors, or other types of authentication sensors, such as, fingerprint sensors, etc.

Memory 105 may be coupled to processor 101 to store instructions for execution by processor 101. In some embodiments, memory 105 is non-transitory. Memory 105 may also store one or more models or modules to implement embodiments described below. Memory 105 may also store data from integrated or external sensors.

Network interface 110 may also be coupled to a number of wireless subsystems 115 (e.g., Bluetooth 166, Wi-Fi 111, Cellular 161, or other networks) to transmit and receive data streams through a wireless link to/from a wireless network, or may be a wired interface for direct connection to networks (e.g., the Internet, Ethernet, or other wired or wireless systems). The device 100 may include one or more local area network transceivers connected to one or more antennas.

The local area network transceiver comprises suitable devices, hardware, and/or software for communicating with and/or detecting signals to/from wireless APs, and/or directly with other wireless devices within a network. In one aspect, the local area network transceiver may comprise a Wi-Fi (802.11x) communication system suitable for communicating with one or more wireless access points.

Device 100 may also include one or more wide area network transceiver(s) that may be connected to one or more antennas. The wide area network transceiver comprises suitable devices, hardware, and/or software for communicating with and/or detecting signals to/from other wireless devices within a network. In one aspect, the wide area network transceiver may comprise a CDMA communication system suitable for communicating with a CDMA network of wireless base stations; however in other aspects, the wireless communication system may comprise another type of cellular telephony network or femtocells, such as, for example, TDMA, LTE, LTE Advanced, WCDMA, UMTS, 4G, or GSM. Additionally, any other type of wireless networking technologies may be used, for example, WiMAX (802.16), Ultra Wide Band, ZigBee, wireless USB, etc.

Embodiments described herein may leverage spare resources of a mobile device 100 that would be expended but otherwise go unused and allocate such spare resources that are likely to be continually available to different operations that may be useful and beneficial to various applications based on a cost profile and a benefit value associated with each operation.

Therefore, in one embodiment, device 100 may comprise: a memory 105; and a processor 101 to: determine spare resources available in a plurality of consecutive time quanta; determine a plurality of candidate operations, wherein each candidate operation is associated with a cost profile with respect to time and a benefit value; and allocate the spare resources for performance of one or more of the candidate operations. In one embodiment, the spare resource may be a computational resource, bus availability, battery consumption, or a combination thereof.

Further, in one embodiment, the benefit value associated with each candidate operation is associated with a benefit of the candidate operation in relation to a continuous and/or implicit authentication application to authenticate a user with contextual background information without requiring explicit user input. Particular examples, will be described hereinafter. Additionally, the benefit value may be increased or decreased based on a context in the determining of the plurality of candidate operations.

Figure 2:
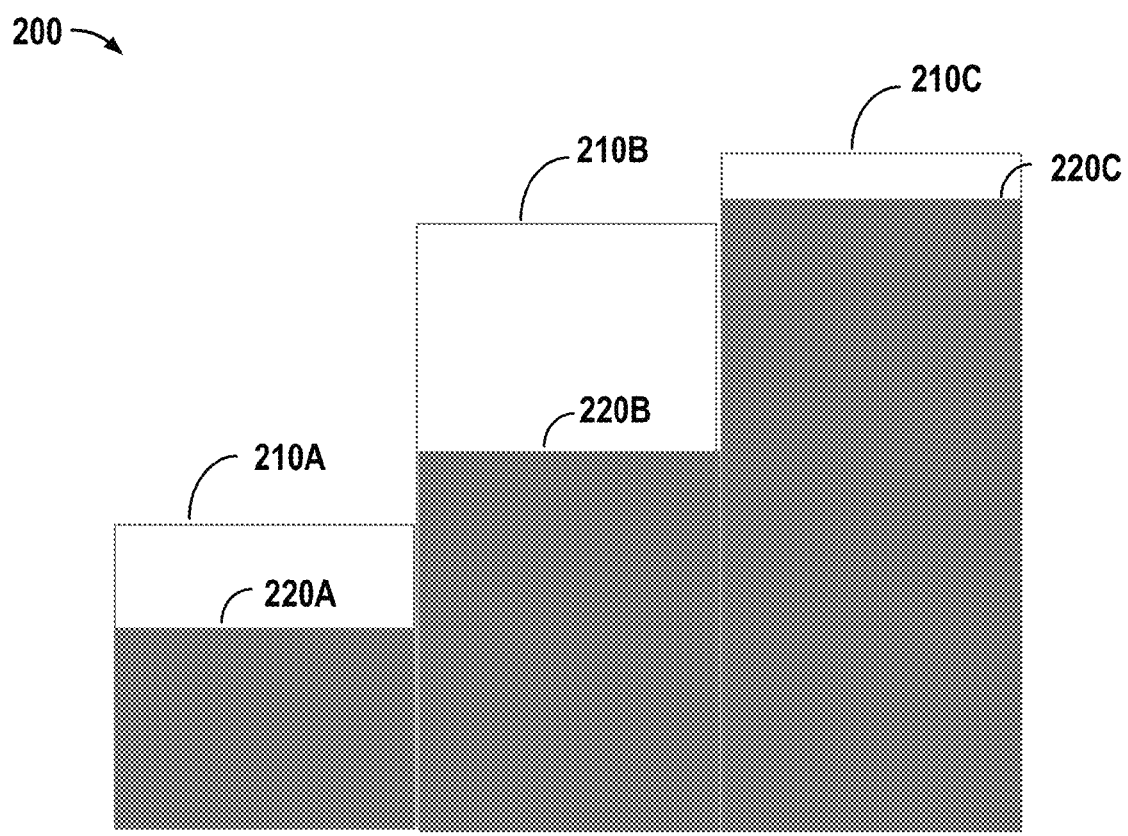
FIG. 2 is an exemplary illustration of resource allocation and usage in a mobile device.

Referring to FIG. 2, an exemplary illustration 200 of resource allocation and usage in a mobile device is shown. Three rectangular columns 210A-C are shown, where the height of the columns indicates the amount of resources allocated and to be expended, and the width of the columns indicates an equal time quantum. In this example, column 210A may represent computational resources allocated and expended by enabling one processor core at a low frequency; column 210B may represent computational resource allocated and expended by enabling two processor cores at the same low frequency; and column 210C may represent computational resources allocated and expended by enabling one processor core at a high frequency. Therefore, column 210B is twice as high as column 210A, and column 210C is slightly higher than column 110B.

Shaded areas 220A-C within columns 210A-C represent resources that are used by one or more tasks that necessitated the allocation of resources. In this example, shaded areas 220A-C may represent computational resources used by a small task, a medium task, and a large task, respectively. Despite the fact that the resources required by each of the tasks have been taken into consideration in the allocation of resources, and because the resource allocation and expenditure is not in continuous amounts, there are spare resources, represented by unshaded areas within each of the columns 210A-C, that are available in each of the three time quanta illustrated. These spare resources would be expended but otherwise go to waste if they are not used for any other operations/tasks. On the other hand, these spare resources may be used to perform certain beneficial operations "for free" in terms of total resources expended.

Figure 3:
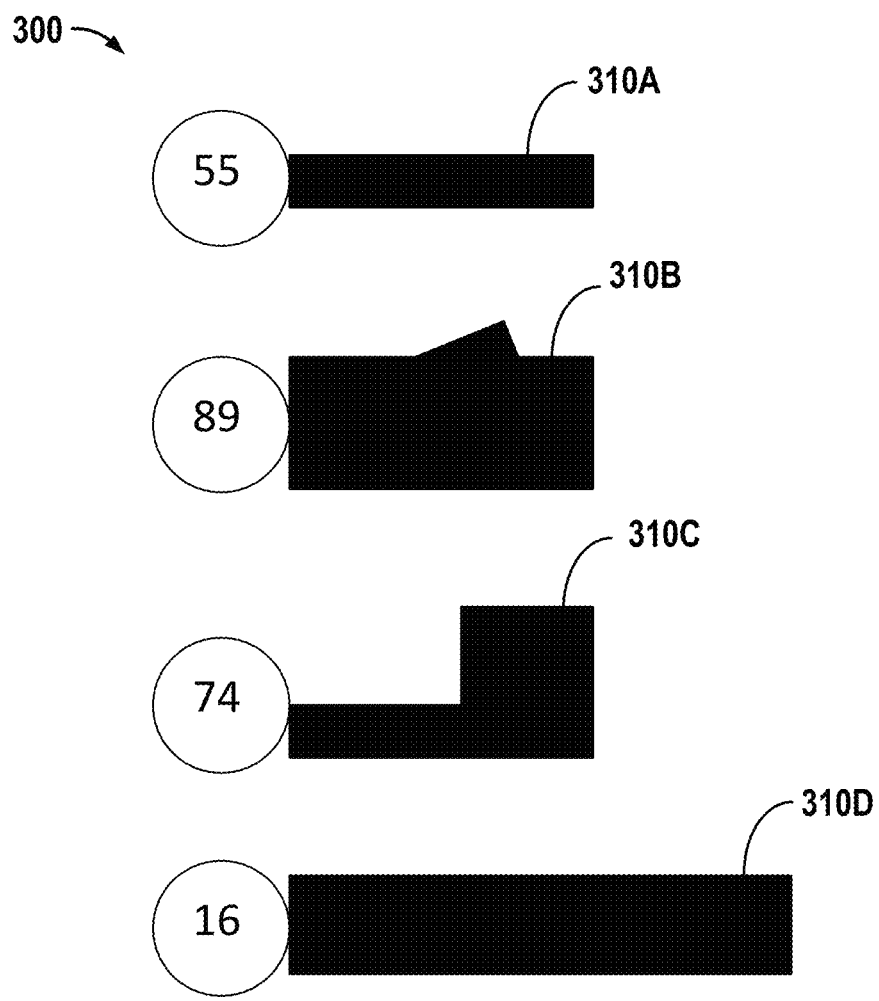
FIG. 3 is an exemplary illustration of costs and benefits of operations in a mobile device.

Referring to FIG. 3, an exemplary illustration 300 of costs and benefits of operations in a mobile device is shown. Each of the solid shapes 310A-D represents the resources required (e.g., cost profiles) to perform a particular operation over one or more time quanta. The height of the solid shapes 310A-D represents the required resources with respect to time. The circled numbers next to the solid shapes 310A-D represent quantified benefit values associated with each operation. In one example, solid shape 310A may represent the resources required to obtain an accelerometer 140 reading, and the operation is associated with 55 units of benefit. Similarly, solid shape 310B may represent the resources required to obtain a Global Positioning System (GPS) position fix (e.g., GPS 160), and is associated with 89 units of benefit; solid shape 310C may represent the resources required to obtain and process a microphone 165 recording, and is associated with 74 units of benefit; and solid shape 310D may represent resources required to obtain a pulse sensor reading, and is associated with 16 units of benefit. As will be explained below, the quantified benefit value associated with an operation may change depending on the context. It should be noted that operations associated with solid shapes 310A-C are completed within a single time quantum, while the operation associated with the solid shape 310D extends into a second time quantum, and requires two time quanta to complete.

Figure 4:
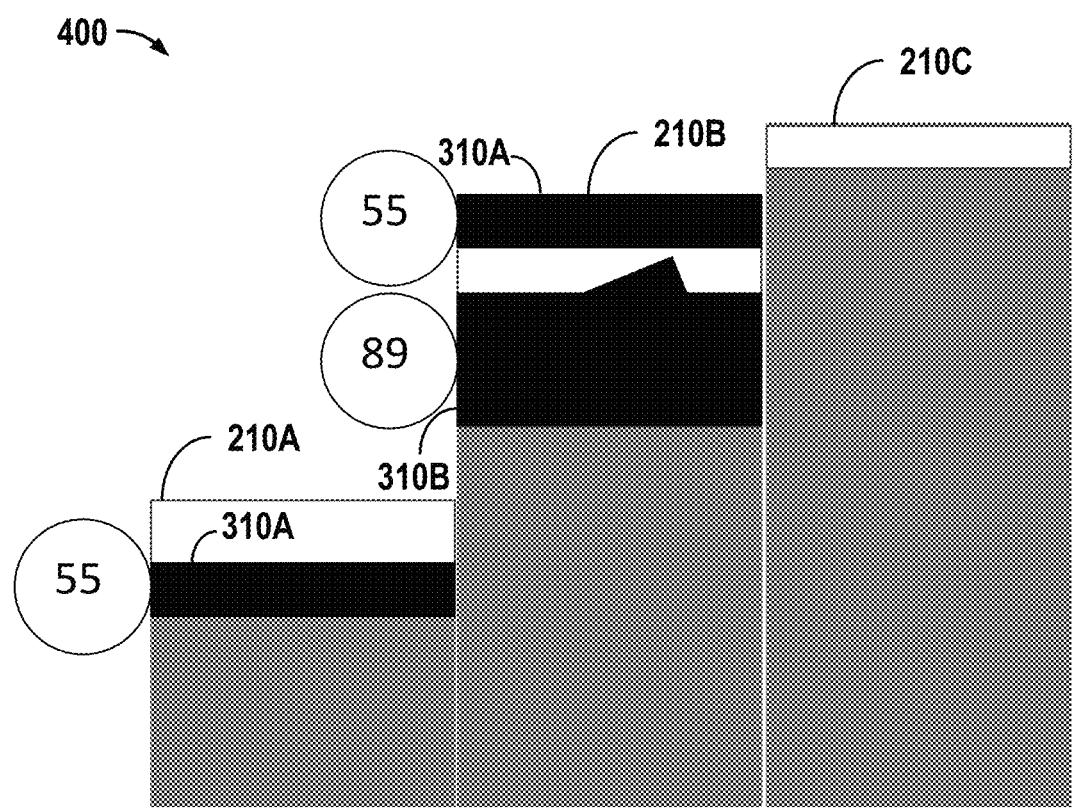
FIG. 4 is an exemplary illustration of spare resource allocation.

Referring to FIG. 4, an exemplary illustration 400 of spare resource allocation is shown. The three columns 210A-C correspond to the same columns 210A-C of FIG. 2, and represent total resources allocated and to be expended in the three time quanta. As explained above, there are spare resources available in each of the three time quanta. These spare resources may be allocated to different operations based on their cost profiles (e.g., resources required) and benefits. In each time quantum, the spare resources may be allocated to one or more operations. Each operation may take one or more time quanta to complete, and some operations may span multiple time quanta. Therefore, in a time window that covers one or more time quanta, there may be multiple possible ways of allocating the spare resources to the operations. As each operation is associated with a quantified benefit value, each way of spare resource allocation corresponds to a sum of benefit values. Therefore, in one embodiment, a particular allocation of spare resources that maximizes the sum of benefit values may be determined. For example, a person of ordinary skill in the art would recognize that this may be a bin packing problem, and may be solved using a greedy algorithm.

In the example illustrated in FIG. 4, the spare resources in the first time quantum are allocated to the operation associated with the solid shape 310A of FIG. 3 (e.g., obtaining an accelerometer reading), which is associated with a benefit value of 55 units, and the spare resources in the second time quantum are allocated to perform two operations: the operation associated with the solid shape 310A of FIG. 3 (e.g., obtaining an accelerometer reading) and the operation associated with the solid shape 310B of FIG. 3 (e.g., obtaining a GPS position fix), the latter of which is associated with a benefit value of 89 units. Spare resources in the third time quantum are not allocated to any additional operations. The sum of the benefit values for the allocation as illustrated may be calculated as 55+55+89=199 units. The sum of benefit values may be evaluated for each of the possible allocations of the spare resources, and the allocation associated with the maximum sum of benefit values may be found and determined.

It should be appreciated that the quantified benefit value associated with an operation may change depending on the context. For example, while obtaining a new GPS position fix may be associated with a benefit value of 89 units, obtaining a second GPS position fix within a very short time (e.g., 2000 milliseconds "ms") of the last fix may be associated with a much lower benefit value, e.g., 11 units, because the location of the mobile device is unlikely to have changed significantly within such a short time. As a further example, while obtaining and processing a microphone recording may be associated with a benefit value of 74 units, if the accuracy rating of the recording sample is below a threshold value, immediately obtaining and processing a second microphone recording may be associated with a high benefit value, e.g., 98 units, to reflect the great benefit of augmenting the first recording sample with a second recording sample in this scenario.

In one embodiment, the benefit value associated with each candidate operation may be associated with a benefit of the candidate operation in relation to a continuous and/or implicit authentication application to authenticate a user based upon contextual background information without requiring explicit user input. Further, the benefit value may be increased or decreased based on the contextual background in determining whether the candidate operation should be used. For example, often implicit authentication applications collect contextual background information to calculate a trust level score, and if the trust level score exceeds the trust level threshold, the mobile device remains unlocked whereas if the trust level score falls below the trust level threshold the mobile device becomes locked and requires explicit authentication (e.g., a password input, a manual fingerprint input, etc.). Utilizing the previous example of FIG. 4, assuming the trust threshold is 4 on a trust level score range of 1-10 for the mobile device to remain unlocked, if the user just authenticated themselves with an explicit authentication (e.g., a fingerprint input) such that the trust level score was previously 9, and it has been a short period of time, such that the benefit value has not decreased, then to allocate spare resources, the candidate operation selected may simply be the first column—the solid shape 310A (accelerometer reading) with a benefit value of 55, to determine if the mobile device has been moved, as the mobile device previously had a high trust value and will probably remain unlocked (e.g., not falling below the trust threshold of 4). On the other hand, if the trust level score has become low (e.g., 5) because the mobile device has not been moved for a predetermined period of time and no user input has been received for a predetermined period of time, then to allocate spare resources, the candidate operation selected may be the second column—the solid shape 310A (accelerometer reading) and solid shape 310B (GPS position) [55 and 89—benefit values] to determine both movement and a known position via GPS to determine a higher benefit value, as the mobile device previously had a low trust value and is close to becoming locked (e.g., falling below the trust threshold of 4). Other example sensor inputs for candidate operations for continuous and implicit authentication may include the previously described microphone input for background voice authentication or pulse input for background biometric authentication; however, it should be appreciated that any sensor input for background implicit authentication may be utilized. Further, it should be appreciated that these are just examples of sensor readings, benefit values, etc., that may be utilized in continuous and/or implicit authentication and security applications related to locking/unlocking. These types of methods may likewise be used for determining trust values/trust thresholds for applications related to visiting web-sites, making phone calls, on-line purchases, etc. Moreover, these types of methods may be used for determining trust values/trust thresholds for any type of application.

Sometimes, two or more operations may have a synergistic effect in combination. This may be reflected with an effective benefit value assigned to the combination (e.g., a subset of candidate operations) that is greater than the sum of the individual benefit values associated with individual operations. For example, while obtaining an accelerometer reading may be associated with a benefit value of 55 units, and obtaining a GPS position fix may be associated with a benefit value of 89 units, the combination of the two operations performed in the same time quantum may be associated with an effective benefit value of 192 units, that is, a benefit value greater than the sum of the individual benefit values associated with the two individual operations (144 units). On the other hand, two or more operations (e.g., a subset of candidate operations) performed in combination may be redundant, and this may be reflected with an effective benefit value assigned to the combination that is less than the sum of the individual benefit values associated with the individual operations. In embodiments where the effective benefit value is used, the sum of the effective benefit values, rather than the individual benefit values, may be maximized in the allocation of spare resources (i.e., the effective benefit value and the individual benefit value are the same for operations that are not affected by either a synergistic effect or a redundancy effect).

It should be appreciated that the operations performed using the spare resources may be useful to two or more applications, while the benefit value associated with each operation may be different depending on the application. For example, for a first application being run on a mobile device, the first, second, third, and fourth operations may be associated with benefit values of 52, 36, 79, and 62 units, respectively; and for a second application, the same first, second, third, and fourth operations may instead be associated with benefit values of 55, 89, 74, and 16 units, respectively. Therefore, under different scenarios, it may be preferable to maximize the sum of benefit values for one particular application, for one particular combination of applications, or for all applications, when spare resources are allocated. In other words, only the benefit values associated with applications to which the benefit maximization effort is directed are factored into the determination of allocation of spare resources.

Figure 5:
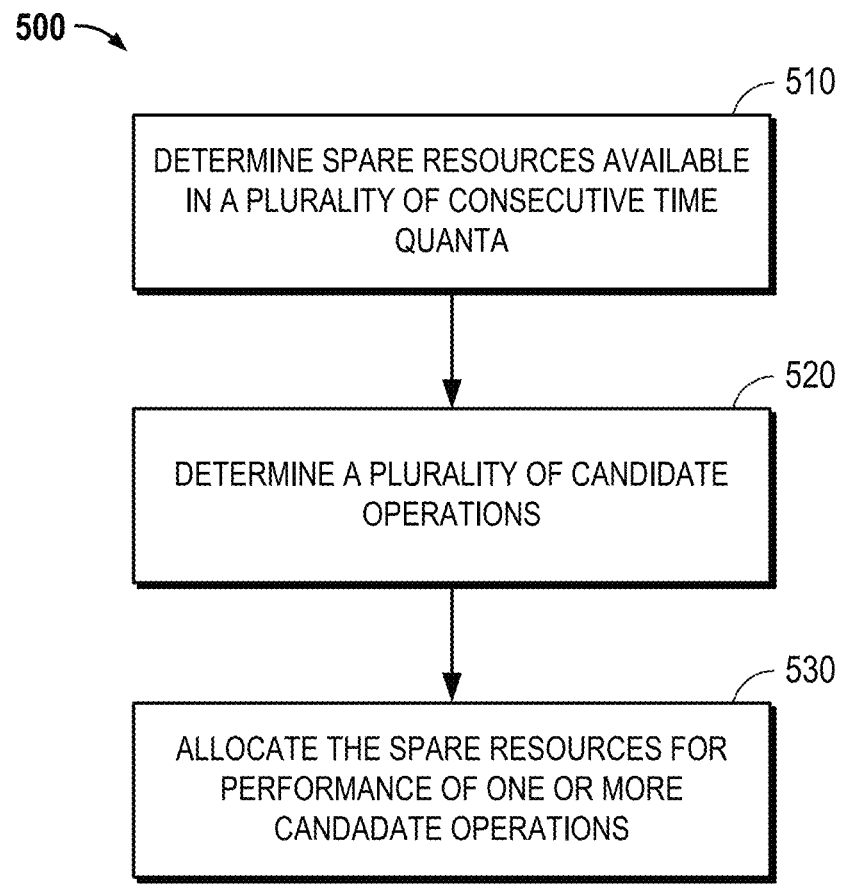
FIG. 5 is a flowchart illustrating an exemplary method for allocating spare resources to operations.

Referring to FIG. 5, a flowchart illustrating an exemplary method 500 for allocating spare resources to operations is shown. At block 510, spare resources available in a plurality of consecutive time quanta may be determined. The resources involved may be computational power, bus availability, or battery consumption, etc. At block 520, a plurality of candidate operations may be determined, wherein each candidate operation is associated with a cost profile with respect to time and a benefit value. Each candidate operation may be completed in one or more time quanta. The benefit value of a candidate operation may be modified (increased or decreased) based on a context. At block 530, the spare resources may be allocated for performance of one or more candidate operations, such that a sum of benefit values associated with the candidate operations performed is maximized. In some embodiments, a combination of candidate operations may be associated with an effective benefit value that may be greater or less than the sum of the individual benefit values because of either a synergistic or a redundancy effect. Therefore, the sum of the effective benefit values, rather than the individual benefit values, may be maximized when the effective benefit value is used (i.e., the effective benefit value and the individual benefit value are the same for candidate operations that are not affected by either a synergistic effect or a redundancy effect). In some further embodiments, each candidate operation may be associated with a plurality of application-specific benefit values (a first benefit value for a first application, a second benefit value for a second application, etc.), and the sum of benefit values may be maximized for a particular application, a particular combination of applications, or all applications, in the allocation of the spare resources.

Therefore, embodiments described herein leverage spare resources that would be expended but otherwise go unused and use such spare resources to perform one or more operations that may be useful or beneficial to certain applications. The spare resources may be continually available, and the applications benefited may include continuous and/or implicit security and authentication applications, or mapping applications that require frequent location fix updates, etc. However, it should be appreciated that techniques according to aspects of the invention may be utilized with any type of application or applications. The candidate operations are associated with benefit values, the sum of which are maximized in the allocation of the spare resources. Therefore, the spare resources are utilized for beneficial operations without an additional expenditure of resources.

It should be appreciated that aspects of the invention previously described may be implemented in conjunction with the execution of instructions (e.g., applications) by processor 101 of device 100, as previously described. Particularly, circuitry of the device, including but not limited to processor, may operate under the control of an application, program, routine, or the execution of instructions to execute methods or processes in accordance with embodiments of the invention (e.g., the processes of FIG. 5). For example, such a program may be implemented in firmware or software (e.g., stored in memory and/or other locations) and may be implemented by processors and/or other circuitry of the devices. Further, it should be appreciated that the terms processor, microprocessor, circuitry, controller, etc., refer to any type of logic or circuitry capable of executing logic, commands, instructions, software, firmware, functionality, etc.

Methods described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

Example methods, apparatuses, or articles of manufacture presented herein may be implemented, in whole or in part, for use in or with mobile communication devices. As used herein, "mobile device," "mobile communication device," "hand-held device," "tablets," etc., or the plural form of such terms may be used interchangeably and may refer to any kind of special purpose computing platform or device that may communicate through wireless transmission or receipt of information over suitable communications networks according to one or more communication protocols, and that may from time to time have a position or location that changes. As a way of illustration, special purpose mobile communication devices, may include, for example, cellular telephones, satellite telephones, smart telephones, heat map or radio map generation tools or devices, observed signal parameter generation tools or devices, personal digital assistants (PDAs), laptop computers, personal entertainment systems, e-book readers, tablet personal computers (PC), personal audio or video devices, personal navigation units, wearable devices, or the like. It should be appreciated, however, that these are merely illustrative examples relating to mobile devices that may be utilized to facilitate or support one or more processes or operations described herein.

The methodologies described herein may be implemented in different ways and with different configurations depending upon the particular application. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

The herein described storage media may comprise primary, secondary, and/or tertiary storage media. Primary storage media may include memory such as random access memory and/or read-only memory, for example. Secondary storage media may include mass storage such as a magnetic or solid state hard drive. Tertiary storage media may include removable storage media such as a magnetic or optical disk, a magnetic tape, a solid state storage device, etc. In certain implementations, the storage media or portions thereof may be operatively receptive of, or otherwise configurable to couple to, other components of a computing platform, such as a processor.

In at least some implementations, one or more portions of the herein described storage media may store signals representative of data and/or information as expressed by a particular state of the storage media. For example, an electronic signal representative of data and/or information may be "stored" in a portion of the storage media (e.g., memory) by affecting or changing the state of such portions of the storage media to represent data and/or information as binary information (e.g., ones and zeros). As such, in a particular implementation, such a change of state of the portion of the storage media to store a signal representative of data and/or information constitutes a transformation of storage media to a different state or thing.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating,", "identifying", "determining", "establishing", "obtaining", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in some implementations" or other like phrases in various places throughout this specification are not necessarily all referring to the same feature, example, and/or limitation. Furthermore, the particular features, structures, or characteristics may be combined in one or more examples and/or features.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method for allocating spare resources in a device, comprising:
   determining spare resources available in a plurality of consecutive time quanta;
   determining a plurality of candidate operations, wherein each candidate operation is associated with a cost profile with respect to time and a benefit value associated with a benefit of the candidate operation in relation to authentication; and
   allocating the spare resources for performance of one or more of the candidate operations.

2. The method of claim 1, wherein the spare resources is one of computational resources, bus availability, or battery consumption.

3. The method of claim 1, wherein at least one benefit value is increased or decreased based on a context in the determining of the plurality of candidate operations.

4. The method of claim 1, wherein a particular combination of a plural subset of candidate operations is associated with an effective benefit value that is greater or less than a sum of the individual benefit values associated with the plural subset of candidate operations, and a sum of effective benefit values associated with the candidate operations performed is maximized in the allocating of the spare resources.

5. The method of claim 1, wherein each candidate operation is associated with a plurality of application-specific benefit values, each benefit value corresponding to a particular application, and the sum of benefit values associated with the candidate operations performed is maximized for a particular application or for a particular combination of applications.

6. The method of claim 1, wherein each candidate operation is associated with a plurality of application-specific benefit values, each benefit value corresponding to a particular application, and the sum of benefit values associated with the candidate operations performed is maximized for all particular applications.

7. An apparatus for allocating spare resources, comprising:
- a memory; and
- a processor coupled to the memory, the processor to:
  - determine spare resources available in a plurality of consecutive time quanta,
  - determine a plurality of candidate operations, wherein each candidate operation is associated with a cost profile with respect to time and a benefit value associated with a benefit of the candidate operation in relation to authentication, and
  - allocate the spare resources for performance of one or more of the candidate operations.

8. The apparatus of claim 7, wherein the spare resources is one of computational resources, bus availability, or battery consumption.

9. The apparatus of claim 7, wherein at least one benefit value is increased or decreased based on a context in the determining of the plurality of candidate operations.

10. The apparatus of claim 7, wherein a particular combination of a plural subset of candidate operations is associated with an effective benefit value that is greater or less than a sum of the individual benefit values associated with the plural subset of candidate operations, and a sum of effective benefit values associated with the candidate operations performed is maximized in the allocating of the spare resources.

11. The apparatus of claim 7, wherein each candidate operation is associated with a plurality of application-specific benefit values, each benefit value corresponding to a particular application, and the sum of benefit values associated with the candidate operations performed is maximized for a particular application or for a particular combination of applications.

12. The apparatus of claim 7, wherein each candidate operation is associated with a plurality of application-specific benefit values, each benefit value corresponding to a particular application, and the sum of benefit values associated with the candidate operations performed is maximized for all particular applications.

13. An apparatus method for allocating spare resources, comprising:
- means for determining spare resources available in a plurality of consecutive time quanta;
- means for determining a plurality of candidate operations, wherein each candidate operation is associated with a cost profile with respect to time and a benefit value associated with a benefit of the candidate operation in relation to authentication; and
- means for allocating the spare resources for performance of one or more of the candidate operations.

14. The apparatus of claim 13, wherein the spare resources is one of computational resources, bus availability, or battery consumption.

15. The apparatus of claim 13, wherein at least one benefit value is increased or decreased based on a context in the means for determining the plurality of candidate operations.

16. The apparatus of claim 13, wherein a particular combination of a plural subset of candidate operations is associated with an effective benefit value that is greater or less than a sum of the individual benefit values associated with the plural subset of candidate operations, and a sum of effective benefit values associated with the candidate operations performed is maximized in the means for allocating the spare resources.

17. The apparatus of claim 13, wherein each candidate operation is associated with a plurality of application-specific benefit values, each benefit value corresponding to a particular application, and the sum of benefit values associated with the candidate operations performed is maximized for a particular application or for a particular combination of applications.

18. The apparatus of claim 13, wherein each candidate operation is associated with a plurality of application-specific benefit values, each benefit value corresponding to a particular application, and the sum of benefit values associated with the candidate operations performed is maximized for all particular applications.

19. A non-transitory computer-readable medium comprising code which, when executed by a processor, causes the processor to perform a method comprising:
- determining spare resources available in a plurality of consecutive time quanta;
- determining a plurality of candidate operations, wherein each candidate operation is associated with a cost profile with respect to time and a benefit value associated with a benefit of the candidate operation in relation to authentication; and
- allocating the spare resources for performance of one or more of the candidate operations.

20. The non-transitory computer-readable medium of claim 19, wherein the spare resources is one of computational resources, bus availability, or battery consumption.

21. The non-transitory computer-readable medium of claim 19, wherein at least one benefit value is increased or decreased based on a context in the determining of the plurality of candidate operations.

22. The non-transitory computer-readable medium of claim 19, wherein a particular combination of a plural subset of candidate operations is associated with an effective benefit value that is greater or less than a sum of the individual benefit values associated with the plural subset of candidate operations, and a sum of effective benefit values associated with the candidate operations performed is maximized in the allocating of the spare resources.

23. The non-transitory computer-readable medium of claim 19, wherein each candidate operation is associated with a plurality of application-specific benefit values, each benefit value corresponding to a particular application, and the sum of benefit values associated with the candidate operations performed is maximized for a particular application or for a particular combination of applications.

24. The non-transitory computer-readable medium of claim 19, wherein each candidate operation is associated with a plurality of application-specific benefit values, each benefit value corresponding to a particular application, and the sum of benefit values associated with the candidate operations performed is maximized for all particular applications.

* * * * *